United States Patent
Jitsuishi et al.

(10) Patent No.: US 11,230,988 B2
(45) Date of Patent: Jan. 25, 2022

(54) CONTROL DEVICE AND CONTROL METHOD FOR VARIABLE VALVE TIMING MECHANISM

(71) Applicant: Hitachi Automotive Systems, Ltd., Hitachinaka (JP)

(72) Inventors: Makoto Jitsuishi, Hitachinaka (JP); Nobuhiko Matsuo, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/251,637

(22) PCT Filed: Feb. 20, 2019

(86) PCT No.: PCT/JP2019/006402
§ 371 (c)(1),
(2) Date: Dec. 11, 2020

(87) PCT Pub. No.: WO2019/239636
PCT Pub. Date: Dec. 19, 2019

(65) Prior Publication Data
US 2021/0246846 A1    Aug. 12, 2021

(30) Foreign Application Priority Data
Jun. 13, 2018    (JP) .............................. JP2018-112924

(51) Int. Cl.
*F02D 41/24*    (2006.01)
*F01L 9/22*    (2021.01)
(Continued)

(52) U.S. Cl.
CPC ............ *F02D 41/2432* (2013.01); *F01L 9/22* (2021.01); *F02D 13/0219* (2013.01);
(Continued)

(58) Field of Classification Search
None
See application file for complete search history.

(56) References Cited

U.S. PATENT DOCUMENTS 6,332,438 B1 * 12/2001 Machida ............... F01L 1/3442
123/90.12
6,860,245 B2 * 3/2005 Hosoya .................... F01L 1/34
123/90.15
(Continued)

FOREIGN PATENT DOCUMENTS

JP    2003-295954 A    10/2003
JP    2004-162706 A    6/2004
(Continued)

OTHER PUBLICATIONS

International Search Report (PCT/ISA/210) issued in PCT Application No. PCT/JP2019/006402 dated May 7, 2019 with English translation (five (5) pages).
(Continued)

*Primary Examiner* — Patrick Hamo
*Assistant Examiner* — Wesley G Harris
(74) *Attorney, Agent, or Firm* — Crowell & Moring, LLP

(57) ABSTRACT

A control device and a control method for variable valve timing mechanism according to the present invention obtains a first measurement of a rotational phase based on a rotational angle of the motor, obtains a second measurement of the rotational phase based on a relative relationship between a rotational angle of the crankshaft and a rotational angle of the camshaft, calibrates the first measurement based on the second measurement, obtains a derivative term proportional to a rate of change in a deviation between the first measurement and a target value, reduces change in derivative term when calibrating the first measurement based on
(Continued)

the second measurement, and controls the motor based on a manipulated variable including the derivative term.

5 Claims, 12 Drawing Sheets

(51) Int. Cl.
    *F02D 13/02*       (2006.01)
    *F02D 41/00*       (2006.01)
    *F01L 13/00*       (2006.01)

(52) U.S. Cl.
    CPC ....... *F02D 41/009* (2013.01); *F02D 41/2464* (2013.01); *F01L 2013/103* (2013.01); *F01L 2800/09* (2013.01); *F01L 2820/032* (2013.01); *F01L 2820/041* (2013.01); *F01L 2820/042* (2013.01); *F02D 2200/101* (2013.01)

(56) References Cited

U.S. PATENT DOCUMENTS

| | | | | |
|---|---|---|---|---|
| 8,240,279 | B2* | 8/2012 | Wada | F02D 41/20 |
| | | | | 123/90.15 |
| 10,190,449 | B2* | 1/2019 | Kim | F01L 1/344 |
| 2003/0079701 | A1* | 5/2003 | Riedle | F01L 1/34 |
| | | | | 123/90.15 |
| 2004/0011311 | A1* | 1/2004 | Takahashi | F01L 1/34 |
| | | | | 123/90.15 |
| 2005/0211207 | A1* | 9/2005 | Urushihata | F01L 1/024 |
| | | | | 123/90.17 |
| 2007/0089696 | A1* | 4/2007 | Moriya | F01L 1/352 |
| | | | | 123/90.15 |
| 2009/0071425 | A1* | 3/2009 | Inoue | F01L 1/352 |
| | | | | 123/90.15 |
| 2010/0235067 | A1* | 9/2010 | Nomura | F02D 13/0238 |
| | | | | 701/103 |
| 2016/0348603 | A1 | 12/2016 | Mikawa et al. | |

FOREIGN PATENT DOCUMENTS

| | | |
|---|---|---|
| JP | 2007-292038 A | 11/2007 |
| JP | 2008-69719 A | 3/2008 |
| JP | 2015-140765 A | 8/2015 |
| WO | WO 2016/063489 A1 | 4/2016 |

OTHER PUBLICATIONS

Japanese-language Written Opinion (PCT/ISA/237) issued in PCT Application No. PCT/JP2019/006402 dated May 7, 2019 with English translation (six (6) pages).
International Preliminary Report on Patentability (PCT/IB/338 & PCT/IB/373) issued in PCT Application No. PCT/JP2019/006402 dated Dec. 24, 2020, including English translation of document C2 (Japanese-language Written Opinion (PCT/ISA/237) dated Dec. 11, 2020) (six (6) pages.
German-language Office Action issued in German Application No. 11 2019 002 971.1 dated Aug. 9, 2021 with partial English translation (seven (7) pages).

* cited by examiner

CONTROL DEVICE AND CONTROL METHOD FOR VARIABLE VALVE TIMING MECHANISM

TECHNICAL FIELD

The present invention relates to a control device and to a control method for a variable valve timing mechanism, and more specifically, relates to a technique for reducing noise in a manipulated variable.

BACKGROUND ART

A variable valve timing device disclosed in Patent Document 1 determines an actual valve timing based on a rotational phase difference between a crankshaft and a camshaft in the high rotational speed area of the internal combustion engine, whereas, in the low rotational speed area of the internal combustion engine, the device determines an actual valve timing based on an integrated value of an amount of change in rotational phase, which is sequentially calculated based on a manipulated amount of an actuator sensed by a rotational angle signal of the motor.

REFERENCE DOCUMENT LIST

Patent Document

Patent Document 1: JP 2007-292038 A

SUMMARY OF THE INVENTION

Problem to be Solved by the Invention

When controlling a variable valve timing mechanism that makes a rotational phase of a camshaft variable relative to a crankshaft by adjusting rotation of the motor, it is possible to achieve both superior responsiveness and accuracy in determination if the rotational phase is obtained by calibrating a rotational phase obtained based on a rotational angle of the motor based on a rotational phase obtained based on a relative relationship between a rotational angle of the crankshaft and that of the camshaft.

However, if the measurement of the rotational phase changes in a stepwise manner due to the calibration process, a deviation between the measurement of the rotational phase and a target rotational phase, and also, a derivative term proportional to a rate of change in the deviation, greatly change. This may generate noise in a motor manipulated variable, which includes the derivative term.

Then, if noise is generated in the manipulated variable of the motor, there may be a problem in that the controllability of the variable valve timing mechanism decreases.

The present invention has been made in view of such conventional circumstances, and an object of the present invention is to provide a control device and a control method for a variable valve timing mechanism, capable of preventing noise generation in a manipulated variable of the motor, which may occur due to a calibration process of a measurement of a rotational phase, and capable of reducing a decrease in the controllability of the variable valve timing mechanism.

Means for Solving the Problem

Therefore, a control device of a variable valve timing mechanism according to an aspect of the present invention is configured to:

obtain information on a rotational angle of a motor, information on a rotational angle of a crankshaft, and information on a rotational angle of a camshaft;

obtain a first measurement of a rotational phase based on the rotational angle of the motor;

obtain a second measurement of the rotational phase based on a relative relationship between the rotational angle of the crankshaft and the rotational angle of the camshaft;

calibrate the first measurement based on the second measurement;

obtain a derivative term proportional to a rate of change in a deviation between the first measurement and a target value of the rotational phase;

reduce change in derivative term when calibrating the first measurement based on the second measurement;

obtain a manipulated variable of the motor based on the derivative term; and output a signal of the manipulated variable.

Furthermore, a control method for the variable valve timing mechanism according to an aspect of the present invention includes the steps of:

obtaining a first measurement of a rotational phase based on a rotational angle of the motor;

obtaining a second measurement of the rotational phase based on a relative relationship between a rotational angle of a crankshaft and a rotational angle of a camshaft;

calibrating the first measurement based on the second measurement;

obtaining a derivative term proportional to a rate of change in a deviation between the first measurement and a target value of the rotational phase;

reducing change in derivative term when calibrating the first measurement based on the second measurement; and controlling the motor based on a manipulated variable including the derivative term.

Effects of the Invention

According to the above invention, it is possible to prevent noise generation in a manipulated variable of the motor, which may occur due to a calibration process of a measurement of a rotational phase, and ultimately, to reduce a decrease in the controllability of the variable valve timing mechanism.

MODE FOR CARRYING OUT THE INVENTION

Hereinbelow, an embodiment of the present invention will be described.

Figure 1:
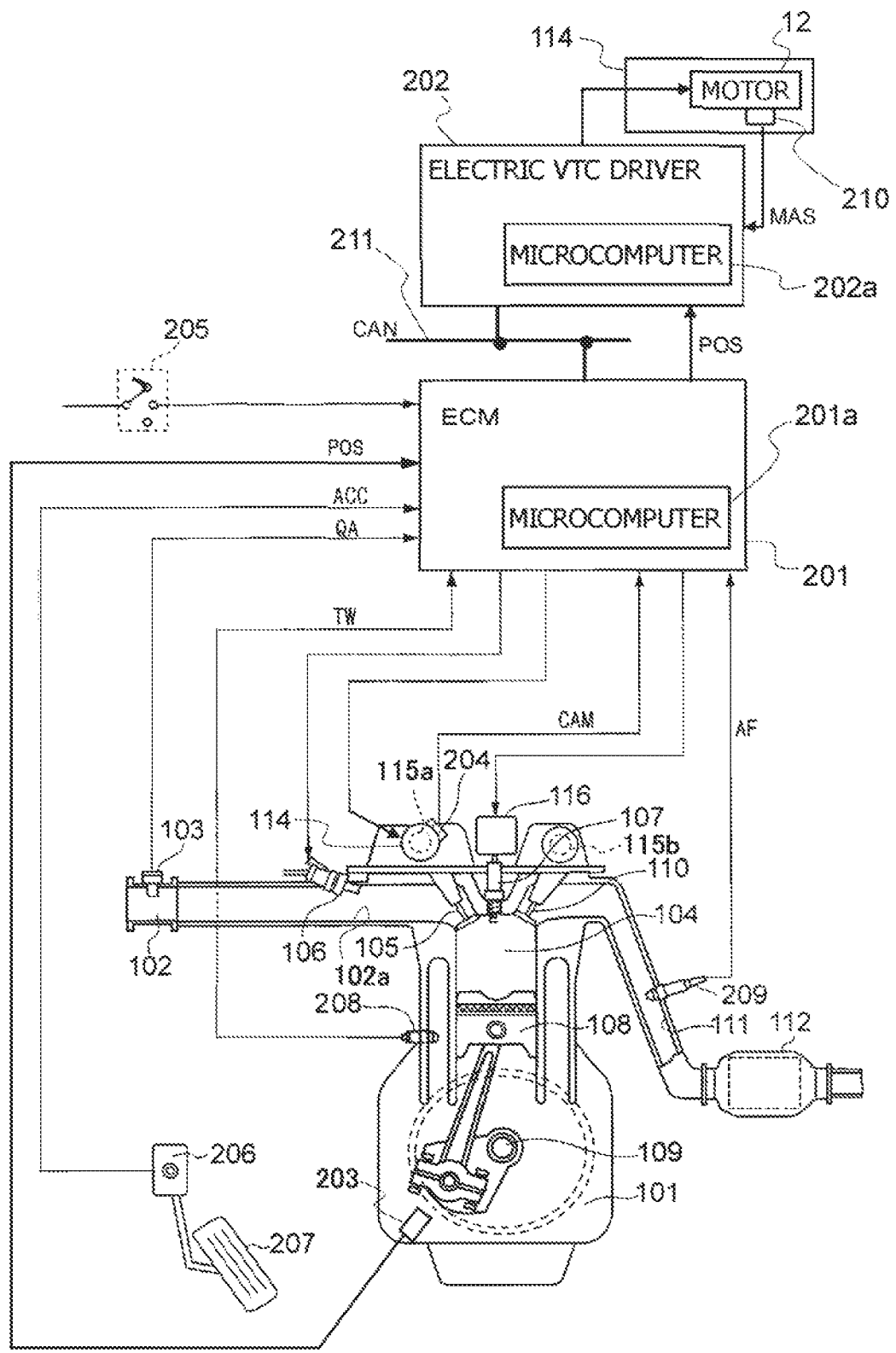
FIG. 1 is a system configuration diagram showing an aspect of an internal combustion engine for a vehicle.

FIG. 1 is a diagram showing an aspect of an internal combustion engine for a vehicle provided with a variable valve timing mechanism.

An internal combustion engine 101 shown in FIG. 1 is provided with an intake air amount sensor 103 in an intake duct 102, and intake air amount sensor 103 senses intake air flow rate QA of internal combustion engine 101.

An intake valve 105 opens and closes an intake port of a combustion chamber 104 of each cylinder.

A fuel injection valve 106, which is an aspect of a fuel injection device, injects gasoline as fuel into an intake port 102a of each cylinder.

Fuel injected from fuel injection valve 106 is taken with air into combustion chamber 104 through intake valve 105, and is spark-ignited by a spark plug 107 and burned in combustion chamber 104.

The resultant combustion pressure presses down a piston 108 toward a crankshaft 109, and thereby rotates crankshaft 109.

An exhaust valve 110 is configured to open and close an exhaust port of combustion chamber 104. When exhaust valve 110 is open, exhaust gas is discharged from combustion chamber 104 to an exhaust pipe 111.

A catalytic converter 112 including a catalyst, such as a three-way catalyst, is disposed in exhaust pipe 111.

Intake valve 105 opens in accordance with the rotation of an intake camshaft 115a rotationally driven by crankshaft 109. Exhaust valve 110 opens in accordance with the rotation of an exhaust camshaft 115b rotationally driven by crankshaft 109.

Variable valve timing mechanism 114 is a mechanism configured to make the rotational phase of intake camshaft 115a variable relative to crankshaft 109 by adjusting the rotational speed of a motor 12, which serves as an actuator, to continuously vary the valve timing of intake valve 105, which is an engine valve.

An ignition module 116 is directly attached to spark plug 107, and supplies ignition energy to spark plug 107. Ignition module 116 includes an ignition coil and a power transistor configured to control power supply to the ignition coil.

A control device that controls the operation of internal combustion engine 101 includes: an engine control module (hereinafter, referred to as "ECM") 201 that controls fuel injection performed by fuel injection valve 106 and ignition performed by spark plug 107; and an electric VTC driver 202 that controls variable valve timing mechanism 114.

ECM 201 is an electronic control unit including a microcomputer 201a, and electric VTC driver 202 is an electronic control unit including a microcomputer 202a.

ECM 201 receives signals from various sensors, and performs computing processing according to a program stored in advance in a memory, to calculate and output manipulated variables of, for example, fuel injection valve 106 and ignition module 116.

Furthermore, electric VTC driver 202 receives, for example, a signal transmitted from ECM 201, and performs computing processing according to a program stored in advance in a memory, to calculate and output a manipulated variable of variable valve timing mechanism 114.

ECM 201 and electric VTC driver 202 are configured to be able to communicate with each other via a communication circuit 211, such as a controller area network (CAN).

As the abovementioned sensors, internal combustion engine 101 includes, in addition to intake air amount sensor 103, a crank angle sensor 203 that outputs crank angle signal POS for each predetermined angular position of crankshaft 109, an accelerator opening sensor 206 that senses a depression amount of a throttle pedal 207, that is, accelerator opening ACC, a cam angle sensor 204 that outputs cam angle signal CAM for each predetermined angular position of intake camshaft 115a, a water temperature sensor 208 that senses temperature TW of cooling water of internal combustion engine 101, and an air-fuel ratio sensor 209 that is provided in an exhaust pipe 111 upstream of catalytic converter 112, and senses air-fuel ratio AF based on the concentration of oxygen contained in exhaust gas.

ECM 201 receives signals from these various sensors, and also receives a signal from an ignition switch 205, which is a main switch for starting and stopping internal combustion engine 101.

Variable valve timing mechanism 114 is provided with a motor angle sensor 210 that outputs motor angle signal MAS depending on a rotational angle of the output shaft of motor 12.

Electric VTC driver 202 receives motor angle signal MAS from motor angle sensor 210, and receives crank angle signal POS from crank angle sensor 203.

Here, electric VTC driver 202 may receive crank angle signal POS via ECM 201, or may directly receive crank angle signal POS from crank angle sensor 203.

Figure 2:
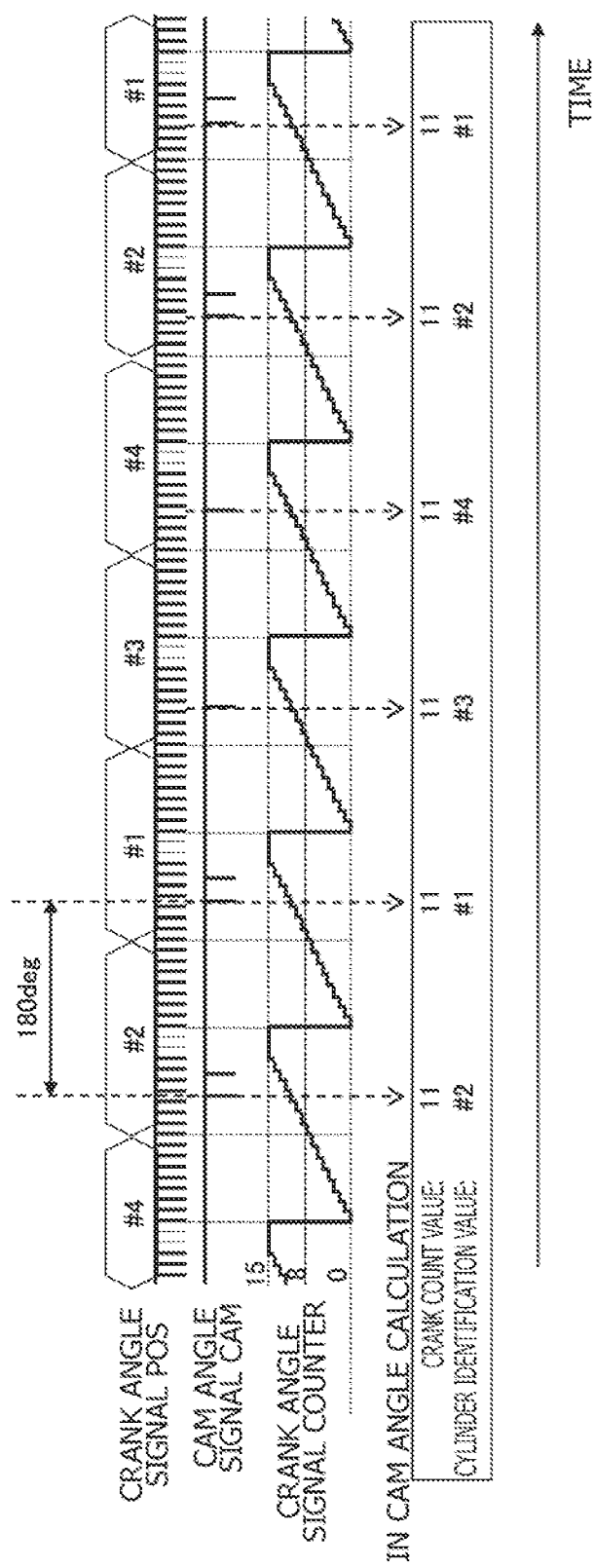
FIG. 2 is a timing diagram showing an aspect of output patterns of crank angle signal POS and cam angle signal CAM.

FIG. 2 shows an aspect of output patterns of crank angle signal POS and cam angle signal CAM.

As shown in FIG. 2, crank angle signal POS is a pulse signal having a signal output pattern set so as to generate a pulse generally for each unit crank angle while skipping one or more consecutive pulses for each crank angle that corresponds to a stroke phase difference between cylinders.

The unit crank angle, which is the output interval of crank angle signal POS, may be, for example, 10 degrees. The stroke phase difference between cylinders corresponds to the ignition interval, which may be 180 degrees of crank angle for a four-cylinder straight engine.

Here, crank angle sensor 203 may be a sensor that outputs both crank angle signal POS having pulses each generated regularly for a unit crank angle, and having no pulse skip position, and reference crank angle signal REF having pulses each generated for a crank angle that corresponds to the stroke phase difference between cylinders.

Here, either the pulse skip position of crank angle signal POS or the pulse output position of reference crank angle signal REF indicates whether any of the pistons of the cylinders is positioned at the reference piston position. That is, the information on the pulse skip position of crank angle signal POS is used in ECM 201 to determine the reference crank angle position, instead of reference crank angle signal REF.

On the other hand, cam angle sensor 204 outputs cam angle signal CAM having pulses each generated for a crank angle that corresponds to the stroke phase difference between cylinders.

Intake camshaft 115*a* rotates at half the rotational speed of crankshaft 109. Thus, when internal combustion engine 101 is a four-cylinder straight engine and the crank angle corresponding to the stroke phase difference between cylinders is 180 degrees, 180 degrees of crank angle corresponds to 90 degrees of rotational angle of intake camshaft 115*a*. That is, cam angle sensor 204 outputs cam angle signal CAM upon each 90-degree rotation of intake camshaft 115*a*.

Cam angle signal CAM output from cam angle sensor 204 is a signal used in ECM 201 to determine a cylinder which is positioned at the reference piston position. Hereinafter, the process of determining a cylinder which is positioned at the reference piston position is also referred to as "cylinder identification".

Therefore, in the four-cylinder straight engine, cam angle sensor 204 outputs cam angle signal CAM with a set number of pulses so that the cylinder number can be determined for each crank angle of 180 degrees.

As an example, cam angle sensor 204 outputs a single pulse, a double pulse (two pulses generated in succession), a double pulse, and a single pulse, in this order, for each 180 degrees of crank angle.

ECM 201 performs the cylinder identification process. Specifically, ECM 201 counts the number of pulses of cam angle signal CAM that are output every 180 degrees of crank angle, and thereby identifies which of the four cylinders is positioned at the reference piston position.

Then, ECM 201 identifies a cylinder to be fuel-injected or ignited based on the result of the cylinder identification, and controls fuel injection valve 106 and ignition module 116 for each cylinder.

The pattern of pulses of cam angle signal CAM for the cylinder identification process is not limited to the above-mentioned pattern.

Furthermore, the output characteristics of cam angle sensor 204 may be set so as to allow the cylinder identification to be performed based on the pulse width or amplitude of cam angle signal CAM, instead of the number of pulses of cam angle signal CAM.

Figure 3:
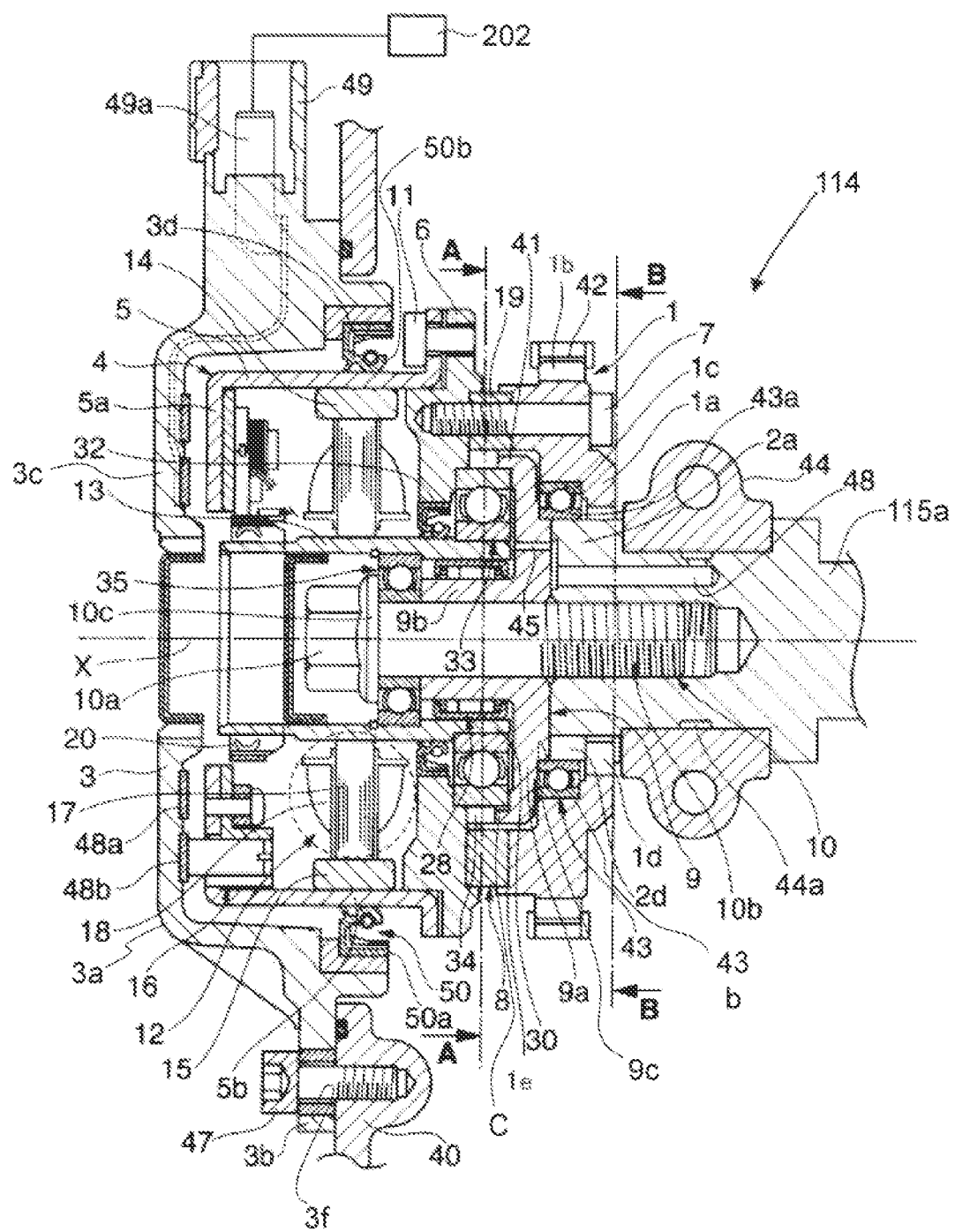
FIG. 3 is a cross-sectional view showing an aspect of a variable valve timing mechanism.
Figure 4:
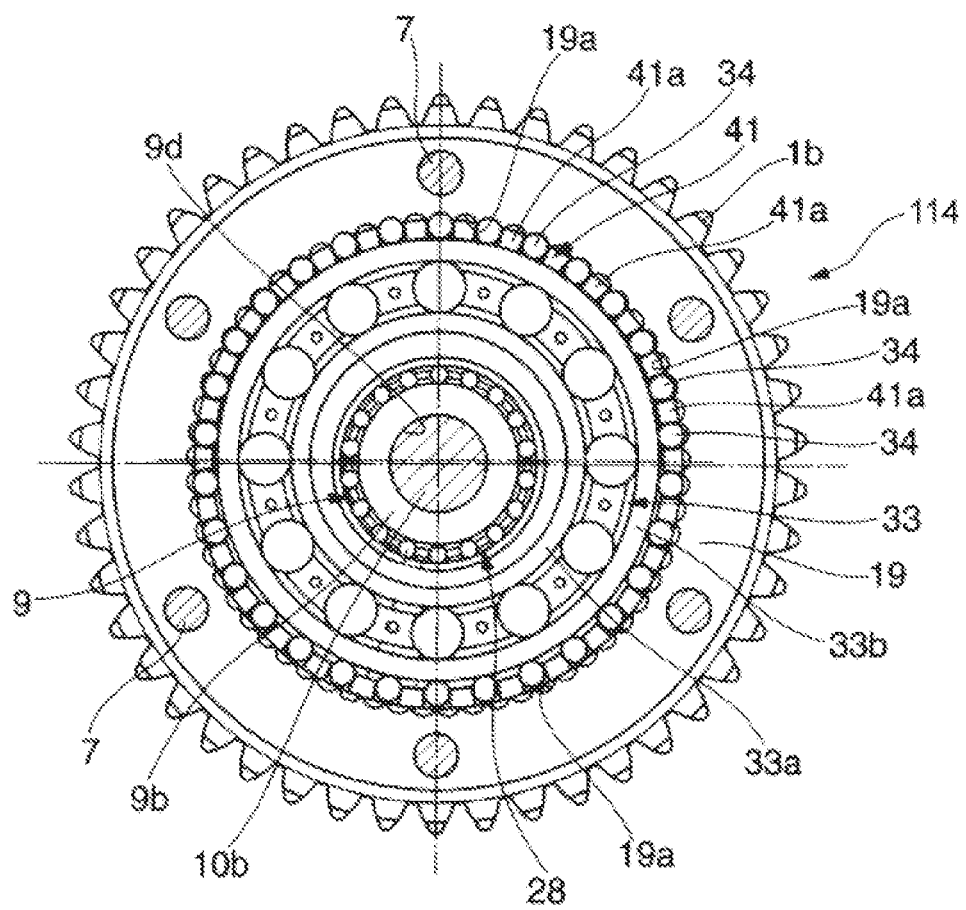
FIG. 4 is a cross-sectional view taken along line A-A of the variable valve timing mechanism shown in FIG. 3.
Figure 5:
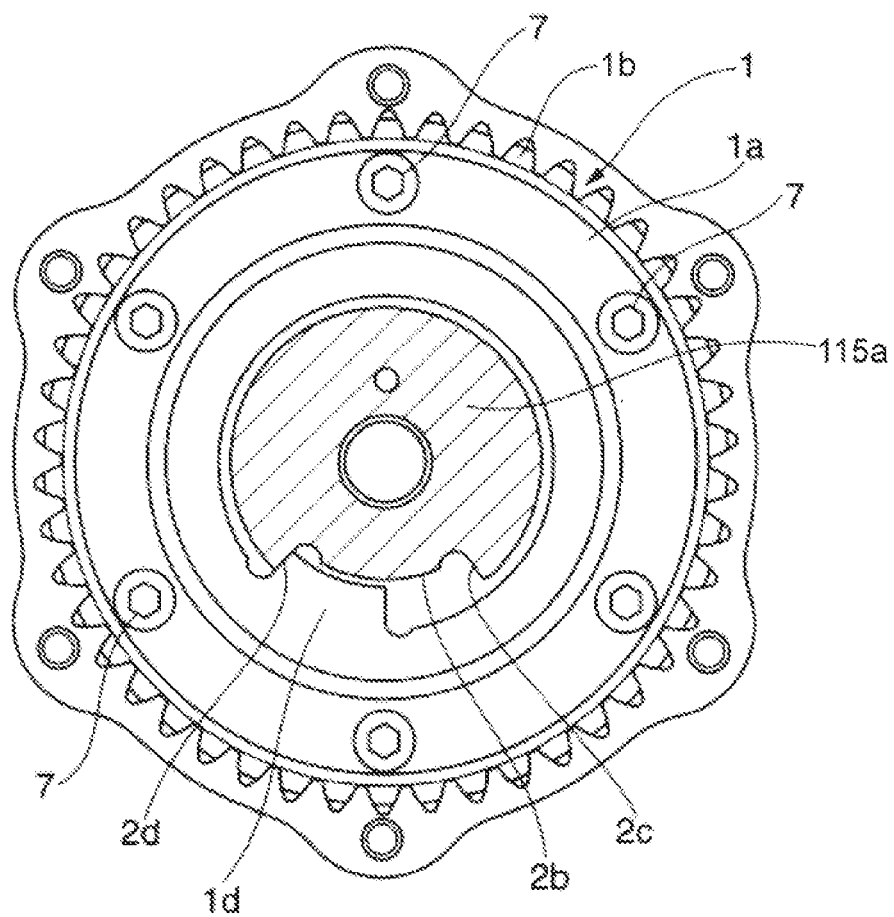
FIG. 5 is a cross-sectional view taken along line B-B of the variable valve timing mechanism shown in FIG. 3.

FIGS. 3 to 5 shows an aspect of variable valve timing mechanism 114.

However, variable valve timing mechanism 114 is not limited to one having the example structure shown in FIGS. 3 to 5, but may be any appropriate known variable valve timing mechanism that makes the rotational phase of the camshaft variable relative to the crankshaft by adjusting the rotational speed of the motor.

Variable valve timing mechanism 114 shown in FIGS. 3 to 5 includes a timing sprocket 1, intake camshaft 115*a*, a cover member 3, and a phase changer 4. Timing sprocket 1 is an active rotator rotationally driven by crankshaft 109 of internal combustion engine 101. Intake camshaft 115*a*, which is rotatably supported on a cylinder head with a bearing 44 interposed, is rotated by a torque transmitted from timing sprocket 1. Cover member 3 is disposed in front of timing sprocket 1 and fixed with bolts onto a chain cover 40. Phase changer 4, which is disposed between timing sprocket 1 and intake camshaft 115*a*, is configured to change the rotational phase of intake camshaft 115*a* relative to timing sprocket 1.

Timing sprocket 1 includes a sprocket body 1*a* and a gear portion 1*b* integrally provided on the outer periphery of sprocket body 1*a*. Gear portion 1*b* receives a torque from crankshaft 109 via a timing chain 42 wound around gear portion 1*b*.

Timing sprocket 1 is rotatably supported on intake camshaft 115*a* with a third ball bearing 43 interposed between a circular groove 1*c* formed in the inter periphery of sprocket body 1*a* and the outer periphery of a flange portion 2*a* integrally provided at the front end of intake camshaft 115*a*.

An annular protrusion 1*e* is integrally formed on the outer periphery of a front end portion of sprocket body 1*a*.

To the front end portion of sprocket body 1*a*, an annular member 19 and an annular plate 6 are fastened and fixed together in the axial direction with bolts 7. Annular member 19, which is coaxially positioned on the inner periphery of annular protrusion 1*e*, has internal teeth 19*a* on the inner periphery. Internal teeth 19*a* collectively serve as a corrugated meshing portion.

Also, as illustrated in FIG. 5, a stopper protrusion 1*d* is formed so as to span a predetermined circumferential segment of the inner peripheral surface of sprocket body 1*a*. Stopper protrusion 1*d* has a circular arc shape and serves an engaging portion.

On the outer periphery of the front surface of plate 6, a cylindrical housing 5 is fixed with bolts 11. Housing 5 covers a speed reducer 8, motor 12, and other components of phase changer 4.

Motor 12 is configured to actuate variable valve timing mechanism 114.

Housing 5 is made of an iron-based metal and functions as a yoke. Housing 5 integrally has an annular plate-like housing holding portion 5*a* on the front end. Housing 5 is disposed such that its outer periphery including housing holding portion 5*a* is entirely covered with cover member 3 with a predetermined clearance therebetween.

Intake camshaft 115*a* is provided with a drive cam (not shown) on the outer periphery and a driven member 9 at the front end. The drive cam configured to open intake valves 105. Driven member 9, which serves as a passive rotator, is coupled to the front end of intake camshaft 115*a* with a cam bolt 10 inserted in the axial direction.

As illustrated in FIG. 5, flange portion 2*a* of intake camshaft 115*a* has a stopper groove 2*b* extending in the circumferential direction. Stopper groove 2*b* serves as a locking portion for engaging with stopper protrusion 1*d* of sprocket body 1*a*.

Stopper groove 2*b* is formed to have a circular arc shape having a predetermined length in the circumferential direction. While stopper protrusion 1*d* rotates within the range corresponding to the length of stopper groove 2*b*, one of the opposite circumferential end edges of stopper protrusion 1*d* comes into contact with the corresponding one of opposite circumferential edges 2*c*, 2*d* of stopper groove 2*b*. Such contact mechanically regulates the rotational position of intake camshaft 115*a* relative to timing sprocket 1 in the advance and retard directions.

In other words, stopper protrusion 1*d* and stopper groove 2*b* constitute a mechanical stopper, and the angular range within which stopper protrusion 1*d* is allowed to move in stopper groove 2*b* corresponds to the operation range of variable valve timing mechanism 114, i.e., corresponds to the range of variability of rotational phase of intake camshaft 115*a* relative to crankshaft 109.

The position at which one of the end edges of stopper protrusion 1*d* comes into contact with the corresponding one of opposite edges 2*c*, 2*d* of stopper groove 2*b* corresponds to the most advanced valve timing position defined by the mechanical stopper. On the other hand, the position at which the other of the end edges of stopper protrusion 1d comes into contact with the corresponding one of opposite edges 2c, 2d corresponds to the most retarded valve timing position defined by the mechanical stopper.

On the end surface of a head portion 10a of cam bolt 10, a flange-like washer portion 10c is integrally formed. A shaft 10b has an external thread on the outer periphery. The external thread is adapted to be screwed into an internal thread formed in intake camshaft 115a so as to extend in the axial direction from an end of intake camshaft 115a.

Driven member 9 is made of an iron-based metal. As illustrated in FIG. 4, driven member 9 includes a disk portion 9a at the front end and a cylindrical portion 9b at the rear end, which are integrally formed together.

Disk portion 9a of driven member 9 is integrally provided with an annular step protrusion 9c substantially at the radial center of the rear end surface of disk portion 9a. Annular step protrusion 9c has substantially the same outer diameter as flange portion 2a of intake camshaft 115a.

Annular step protrusion 9c and flange portion 2a are inserted into an inner ring 43a of third ball bearing 43 so that the outer peripheral surfaces of annular step protrusion 9c and flange portion 2a are disposed on the inner periphery of inner ring 43a. An outer ring 43b of third ball bearing 43 is press fitted and fixed onto the inner peripheral surface of circular groove 1c of sprocket body 1a.

Disk portion 9a of driven member 9 is further integrally provided, on the outer periphery, with a holder 41, which is adapted to hold multiple rollers 34.

Holder 41 protrudes in the same direction as cylindrical portion 9b from the outer periphery of disk portion 9a, and has multiple elongated protrusions 41a formed at substantially even predetermined intervals in the circumferential direction.

Cylindrical portion 9b has an insertion hole 9d coaxially passing through cylindrical portion 9b. Insertion hole 9d is adapted to receive shaft 10b of cam bolt 10 therethrough. Also, a first needle bearing 28 is provided on the outer periphery of cylindrical portion 9b.

Cover member 3, made of a synthetic resin, includes a cover body 3a bulged in a cup shape, and a bracket 3b integrally provided on the outer periphery of the rear end of cover body 3a.

Cover body 3a is disposed so as to cover substantially the entirety of a front end of phase changer 4, that is, substantially the entirety of housing 5 extending axially rearward from a holding portion 5b, with the predetermined clearance therebetween. Bracket 3b, formed substantially annularly, has six bolt insertion holes 3f passing through bracket 3b at six boss portions.

Bracket 3b is fixed to chain cover 40 with multiple bolts 47. The inner peripheral surface of a front end portion 3c of cover body 3a is provided with inner and outer double slip rings 48a, 48b. Slip rings 48a, 48b are buried and fixed in the inner peripheral surface with their inner end surfaces exposed.

Cover member 3 further includes a connector portion 49 at the upper end thereof.

Connector portion 49 has a connector terminal 49a connected to slip rings 48a, 48b via a conductive member.

To connector terminal 49a, electric power from a battery power source (not shown) is supplied via electric VTC driver 202.

Between the inner peripheral surface of a rear end portion of cover body 3a and the outer peripheral surface of housing 5, a first oil seal 50 is interposed as a sealing member.

First oil seal 50, which has a substantially C-shaped transverse cross section, includes a synthetic rubber base member and a core metal buried therein. An annular base portion 50a on the outer periphery of first oil seal 50 is fitted and fixed in a circular groove 3d formed in the inner peripheral surface of the rear end portion of cover body 3a.

A sealing surface 50b is formed integrally on the inner periphery of annular base portion 50a of first oil seal 50, and is in contact with the outer peripheral surface of housing 5.

Phase changer 4 includes motor 12 and speed reducer 8. Motor 12 is substantially coaxially disposed in front of intake camshaft 115a. Speed reducer 8 reduces the rotational speed of motor 12 and transmits the resultant rotation to intake camshaft 115a.

Motor 12, which is, for example, a brushed DC motor, includes housing 5, a motor shaft 13, a pair of semicircular arc-shaped permanent magnets 14, 15, and a stator 16. Housing 5 serves as a yoke configured to integrally rotate with timing sprocket 1. Motor shaft 13 is an output shaft rotatably provided in housing 5. Permanent magnets 14, 15 are fixed on the inner peripheral surface of housing 5. Stator 16 is fixed to the inner bottom surface of housing holding portion 5a.

Motor shaft 13 is formed in a tubular shape and functions as an armature. On the outer periphery of a substantially center portion, in the axial direction, of motor shaft 13, an iron core rotor 17 having multiple poles is fixed. An electromagnetic coil 18 is wound around the outer periphery of iron core rotor 17.

In addition, a commutator 20 is press fitted and fixed on the outer periphery of a front end portion of motor shaft 13. Commutator 20 is divided into as many segments as the poles of iron core rotor 17, and electromagnetic coil 18 is connected to these segments of commutator 20.

Motor shaft 13 is rotatably supported on the outer peripheral surface of shaft 10b with a first needle bearing 28 and a fourth ball bearing 35 interposed. First needle bearing 28, which serves as primary bearing, is arranged side by side with fourth ball bearing 35 in the axial direction.

In addition, motor shaft 13 is integrally provided with a cylindrical eccentric shaft portion 30 at the rear end of motor shaft 13. Eccentric shaft portion 30 constitutes a part of speed reducer 8.

In addition, a second oil seal 32 is provided between the outer peripheral surface of motor shaft 13 and the inner peripheral surface of plate 6. Second oil seal 32 prevents lubricating oil leak from the interior of speed reducer 8 into motor 12.

The inner periphery of second oil seal 32 is in elastic contact with the outer peripheral surface of motor shaft 13 so that second oil seal 32 provides frictional resistance against the rotation of motor shaft 13.

Speed reducer 8 mainly includes eccentric shaft portion 30, a second ball bearing 33, rollers 34, holder 41, and driven member 9. Eccentric shaft portion 30 is configured to eccentrically rotate. Second ball bearing 33, which serves as secondary bearing, is provided on the outer periphery of eccentric shaft portion 30. Rollers 34 are provided on the outer periphery of second ball bearing 33. Holder 41 holds rollers 34 so as to prevent movement in their rolling direction but permit movement in the radial direction. Driven member 9 is integrally formed with holder 41.

The axis of the cam surface formed on the outer periphery surface of eccentric shaft portion 30 is slightly radially eccentric from the axis X of motor shaft 13. Components including second ball bearing 33 and rollers 34 are configured to collectively serve as a planetary meshing portion.

Second ball bearing 33 is disposed so as to substantially entirely overlap first needle bearing 28 in the radial direction.

An inner ring 33a of second ball bearing 33 is press fitted and fixed onto the outer peripheral surface of eccentric shaft portion 30. Rollers 34 are in constant contact with the outer peripheral surface of outer ring 33b of second ball bearing 33.

An annular clearance C is formed around the outer periphery of an outer ring 33b. Clearance C allows the entire second ball bearing 33 to radially move, i.e., to make eccentricity-related movement along with an eccentric rotation of eccentric shaft portion 30. Rollers 34 are adapted to radially move and sequentially fit in internal teeth 19a of annular member 19 along with an eccentricity-related movement of second ball bearing 33, and to oscillate in the radial direction while being guided in the radial direction by protrusions 41a of holder 41.

Lubricating oil is supplied into speed reducer 8 by lubricating oil supply means.

Lubricating oil supply means includes an oil supply passage 44a, an oil supply hole 48, a small-diameter oil supply hole 45, and three large-diameter oil discharge holes (not shown). Through oil supply passage 44a, which is formed in the interior of bearing 44 of the cylinder head, a lubricating oil is supplied from a main oil gallery (not shown). Oil supply hole 48, which is formed in the interior of intake camshaft 115a so as to extend in the axial direction, communicates with oil supply passage 44a through a groove. Oil supply hole 45 is formed in the interior of driven member 9 so as to pass through driven member 9 in the axial direction. One end of oil supply hole 45 opens to oil supply hole 48. The other end of oil supply hole 45 opens near first needle bearing 28 and second ball bearing 33. The oil discharge holes are formed to pass through driven member 9.

Hereinbelow, the operation of variable valve timing mechanism 114 will be described.

When crankshaft 109 rotates, timing chain 42 transmits the rotation to timing sprocket 1, and timing sprocket 1 rotates accordingly. The resultant torque is transmitted to motor 12 through housing 5, annular member 19, and plate 6, and motor 12 rotate synchronously with crankshaft 109.

In addition, the torque of annular member 19 is transmitted from rollers 34 to intake camshaft 115a through holder 41 and driven member 9. This rotates intake camshaft 115a. As intake camshaft 115a rotates, the cam on intake camshaft 115a opens and closes intake valve 105.

To advance or retard the rotational phase of intake camshaft 115a relative to crankshaft 109, that is, the valve timing of each intake valve 105, electric VTC driver 202 supplies power to motor 12 of variable valve timing mechanism 114 and causes motor 12 to generate torque. This output torque of motor 12 is transmitted to intake camshaft 115a via speed reducer 8.

Specifically, in each revolution of motor shaft 13, eccentric shaft portion 30 eccentrically rotates such that each of rollers 34 rolls over one of internal teeth 19a of annular member 19 to move onto the adjacent internal tooth 19a while being guided in the radial direction by protrusions 41a of holder 41. As motor shaft 13 rotates, rollers 34 sequentially repeat such movement to roll in the circumferential direction.

Such rolling movement of rollers 34 transmits a torque to driven member 9 and rotates driven member 9 at a speed reduced from the rotational speed of motor shaft 13. The speed reduction ratio of the transmitted rotation of driven member 9 to the rotation of motor shaft 13 may be set as desired by adjusting, for example, the number of rollers 34.

As a result, intake camshaft 115a rotates in the forward and reverse directions relative to timing sprocket 1, and the rotational phase of intake camshaft 115a changes. Accordingly, the opening and closing timing of each intake valve 105 is advanced or retarded.

Thus, when motor 12 is passively rotated by a rotational driving force from timing sprocket 1 and motor shaft 13 rotates at the same rotational speed as timing sprocket 1, the rotational phase of intake camshaft 115a relative to crankshaft 109 does not change.

In contrast, when motor 12 generates a rotational torque in the forward rotation direction, and the rotational speed of motor shaft 13 becomes faster than the rotational speed of timing sprocket 1, the rotational phase of intake camshaft 115a relative to crankshaft 109 changes in the retard direction.

On the other hand, when motor 12 generates a rotational torque in the reverse rotation direction, and the rotational speed of motor shaft 13 becomes slower than the rotational speed of timing sprocket 1, the rotational phase of intake camshaft 115a relative to crankshaft 109 changes in the advance direction.

In other words, variable valve timing mechanism 114 is a mechanism that advances or retards the valve timing in accordance with the difference between the rotation amount of motor shaft 13 and the rotation amount of timing sprocket 1, that is, in accordance with the rotational speed of motor shaft 13 relative to timing sprocket 1.

Electric VTC driver 202 includes, as software, a function of variably controlling the rotational phase of intake camshaft 115a relative to crankshaft 109 by adjusting the rotational speed of motor 12. Here, electric VTC driver 202 performs feedback control of the rotational phase by calculating the manipulated variable of motor 12 so that phase measurement RA approaches target value TA.

ECM 201 calculates target value TA of the rotational phase based on the operation state of internal combustion engine 101, and also calculates phase measurement RAP (second measurement) based on crank angle signal POS and cam angle signal CAM. Information on calculated target value TA and phase measurement RAP is transmitted to electric VTC driver 202.

On the other hand, electric VTC driver 202 calculates phase measurement RA (first measurement) based on motor angle signal MAS output from motor angle sensor 210, and calibrates phase measurement RA based on phase measurement RAP at an update timing of phase measurement RAP.

Then, electric VTC driver 202 calculates the manipulated variable (drive duty cycle) for adjusting voltage applied to motor 12, based on a proportional term (proportional component), which is based on a deviation between phase measurement RA and target value TA, an integral term (integral component), which is based on the integrated value of the deviation, and a derivative term (derivative component), which is based on the derivative value (rate of change) of the deviation, and then, electric VTC driver 202 outputs a signal depending on the manipulated variable, to control motor 12.

That is, electric VTC driver 202 performs feedback control that brings phase measurement RA closer to target value TA by the so-called PID control method that changes the manipulated variable of motor 12 by the proportional action, the integral action, and the derivative action.

However, the feedback control is not limited to the PID control method. Electric VTC driver 202 may control motor 12 by, for example, the PD control method that combines the proportional action and the derivative action.

Furthermore, a control unit in which ECM 201 and electric VTC driver 202 are integrated, in other words, a single microcomputer may perform calculation of target value TA, phase measurement RA, phase measurement RAP, and the manipulated variable.

Figure 6:
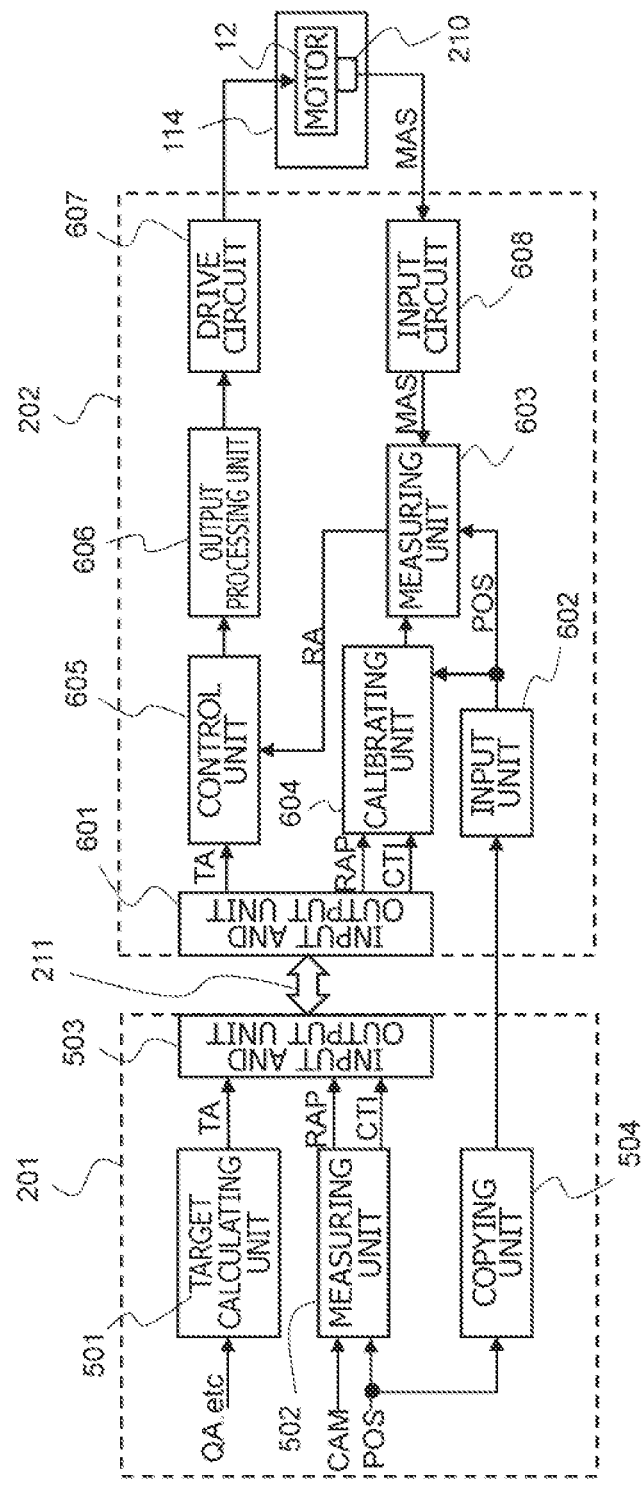
FIG. 6 is a functional block diagram showing an aspect of the control function of an ECM and an electric VTC driver.

Hereinbelow, a control process of variable valve timing mechanism 114 performed by ECM 201 and electric VTC driver 202 will be described in detail with reference to the control function block diagram in FIG. 6.

ECM 201 includes a target value calculating unit 501, a rotational phase measuring unit 502, a CAN input and output circuit 503, and a POS signal copy circuit 504.

Target value calculating unit 501 calculates target value TA based on the operation state of internal combustion engine 101, such as engine load, engine rotational speed, temperature of cooling water, and startup state of the engine. Target value calculating unit 501 then transmits obtained target value TA to electric VTC driver 202 through CAN input and output circuit 503.

Rotational phase measuring unit 502 receives crank angle signal POS output from crank angle sensor 203 and cam angle signal CAM from cam angle sensor 204, and calculates phase measurement RAP every time cam angle signal CAM is input, and also calculates calculation timing information CTI that indicates an update timing of phase measurement RAP.

For example, upon receiving cam angle signal CAM, rotational phase measuring unit 502 calculates phase measurement RAP (deg) of intake camshaft 115a relative to crankshaft 109, by determining a crank angle (deg) from a reference crank angle position determined based on crank angle signal POS to a position at which cam angle signal CAM is input.

For example, when determining the crank angle (deg) from the reference crank angle position to a position at which cam angle signal CAM is input, rotational phase measuring unit 502 may use POS count value CPOS, which is an integrated value of the number of inputs of crank angle signal POS, and/or a crank angle conversion value of the elapsed time obtained based on the rotational speed (rpm) of the engine.

ECM 201 calculates the engine rotational speed (rpm) based on period TPOS of crank angle signal POS.

Furthermore, as calculation timing information CTI, rotational phase measuring unit 502 transmits POS count value CPOS and cylinder identification value CYL at the time when cam angle signal CAM is input, to electric VTC driver 202 through CAN input and output circuit 503 (See FIG. 2).

POS count value CPOS is obtained by counting the number of crank angle signal POS output after the reference crank angle position set based on the skip portion of crank angle signal POS.

Furthermore, cylinder identification value CYL is data that indicates a cylinder number determined to be at a predetermined piston position by the cylinder identification performed based on cam angle signal CAM. Electric VTC driver 202 identifies crank angle signal POS, corresponding to the calculation timing of phase measurement RAP, based on POS count value CPOS and cylinder identification value CYL.

POS signal copy circuit 504 receives crank angle signal POS from crank angle sensor 203, and transmits copied crank angle signal POS to electric VTC driver 202.

On the other hand, electric VTC driver 202 includes, for example, a CAN input and output circuit 601, a POS input circuit 602, a rotational phase measuring unit 603, a calibration processing unit 604, a motion control unit 605, a PWM output processing unit 606, a motor drive circuit 607, and a motor angle input circuit 608.

CAN input and output circuit 601 receives target value TA, phase measurement RAP, and calculation timing information CTI, transmitted from ECM 201, and then, outputs target value TA to motion control unit 605, and outputs phase measurement RAP and calculation timing information CTI to calibration processing unit 604.

POS input circuit 602 receives copied crank angle signal POS transmitted from ECM 201, and then, outputs copied crank angle signal POS to rotational phase measuring unit 603 and calibration processing unit 604.

Rotational phase measuring unit 603 receives copied crank angle signal POS, and also receives motor angle signal MAS from motor angle sensor 210 through motor angle input circuit 608. In addition, rotational phase measuring unit 603 receives the calibration command information from calibration processing unit 604.

Then, rotational phase measuring unit 603 calculates amount of change dRA in rotational phase per calculation cycle, based on a difference between a motor rotational speed calculated based on motor angle signal MAS, and rotational speed of timing sprocket 1 calculated based on copied crank angle signal POS, and also based on a reduction ratio of phase changer 4.

Furthermore, rotational phase measuring unit 603 integrates amount of change dRA, and obtains phase measurement RA as the rotational phase displaced from the reference rotational phase by the integrated value of the amount of change dRA.

Calibration processing unit 604 outputs calibration command information for making phase measurement RA equal to phase measurement RAP, to rotational phase measuring unit 603 at each update timing of phase measurement RAP.

Upon receiving the calibration command information from calibration processing unit 604, rotational phase measuring unit 603 performs a calibration process of phase measurement RA in which phase measurement RA is made to be equal to phase measurement RAP, and then, updates phase measurement RA based on calculated amount of change dRA.

Thereby, rotational phase measuring unit 603 updates phase measurement RA depending on the motor rotational speed, using phase measurement RAP as the reference rotational phase.

In other words, electric VTC driver 202 interpolates the change in rotational phase before the next update of phase measurement RAP, that is, before receiving the next cam angle signal CAM, based on amount of change dRA obtained based on motor angle signal MAS and copied crank angle signal POS, to obtain phase measurement RA for use in the feedback control.

Figure 7:
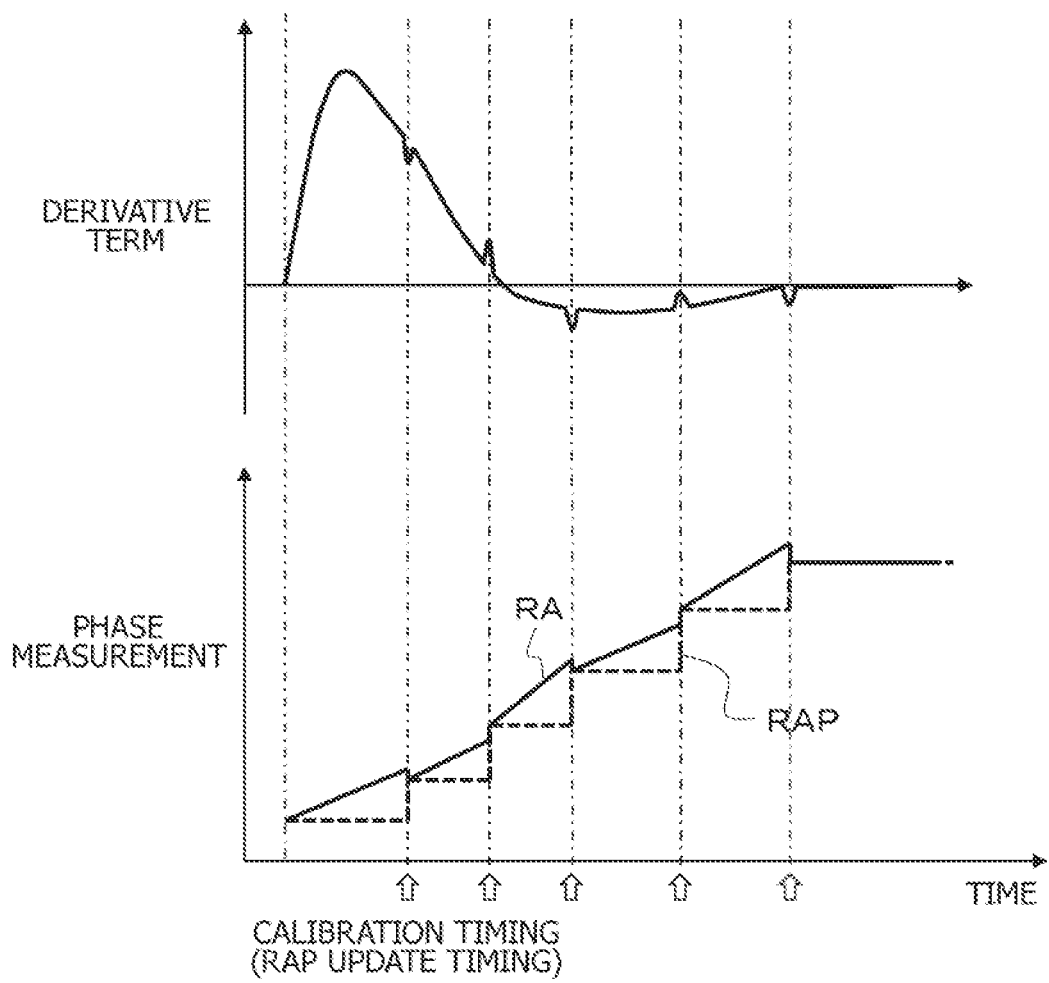
FIG. 7 is a timing diagram showing change in derivative term due to a calibration process of a phase measurement.

FIG. 7 shows the relationship between phase measurement RAP obtained based on crank angle signal POS and a cam angle signal CAM, and phase measurement RA obtained based on motor angle signal MAS and copied crank angle signal POS, in a transient state when target value TA changes.

Phase measurement RAP is updated every time cam angle signal CAM is input, and the previous value is retained until the input of the next cam angle signal CAM.

Therefore, when the rotational speed of internal combustion engine 101 is low and the cycle time of cam angle signal CAM corresponding to the cycle time of the update of phase measurement RAP, increases, the deviation between phase measurement RAP and the actual rotational phase immediately before the update becomes greater. Thus, when feedback control is performed based on phase measurement RAP at that time, the responsiveness and convergence might be decreased.

Here, phase measurement RAP obtained based on crank angle signal POS and cam angle signal CAM is an absolute value, whereas phase measurement RA obtained based on motor angle signal MAS and copied crank angle signal POS is a relative value.

Here, phase measurement RA is capable of updating at constant intervals without being affected by the rotational speed of internal combustion engine 101.

Therefore, since electric VTC driver 202 calibrates phase measurement RA to phase measurement RAP at each update timing of phase measurement RAP, it is possible to sequentially update the measurement between output timings in the output cycle of cam angle signal CAM, and accordingly, it is possible an increase in prevent measurement error. This makes it possible to have the measurement converge to target value TA with good response even when the rotational speed of internal combustion engine 101 is low.

Rotational phase measuring unit 603 outputs phase measurement RA calibrated based on phase measurement RAP, to motion control unit 605.

Motion control unit 605 calculates the deviation between phase measurement RA calculated by rotational phase measuring unit 603, and target value TA calculated by target value calculating unit 501 of ECM 201, and then, as described above, motion control unit 605 sets command voltage of motor 12 by PID control method based on the deviation. Then, motion control unit 605 outputs information on this command voltage to PWM output processing unit 606.

PWM output processing unit 606 outputs a drive pulse signal for performing pulse width modulation (PWM) control of motor drive circuit 607 based on the input command voltage.

Motor drive circuit 607 controls power supply to motor 12 in response to the drive pulse signal, to adjust the voltage applied to motor 12 to the command voltage.

Here, when the calibration process of phase measurement RA to phase measurement RAP is performed at each update timing of phase measurement RAP, phase measurement RA might change in a stepwise manner due to the calibration, and this might cause the derivative term, which is based on the derivative value of the deviation, to greatly change (see FIG. 7). Thus, there is a possibility that noise is generated in the motor manipulated variable, which includes the derivative term, resulting in a decrease in the controllability of variable valve timing mechanism 114.

Therefore, motion control unit 605 of electric VTC driver 202 performs a process of reducing change in derivative term, which may occur due to the calibration when phase measurement RA is calibrated, so as to prevent a decrease in the controllability of variable valve timing mechanism 114, which may occur due to the calibration process.

Figure 8:
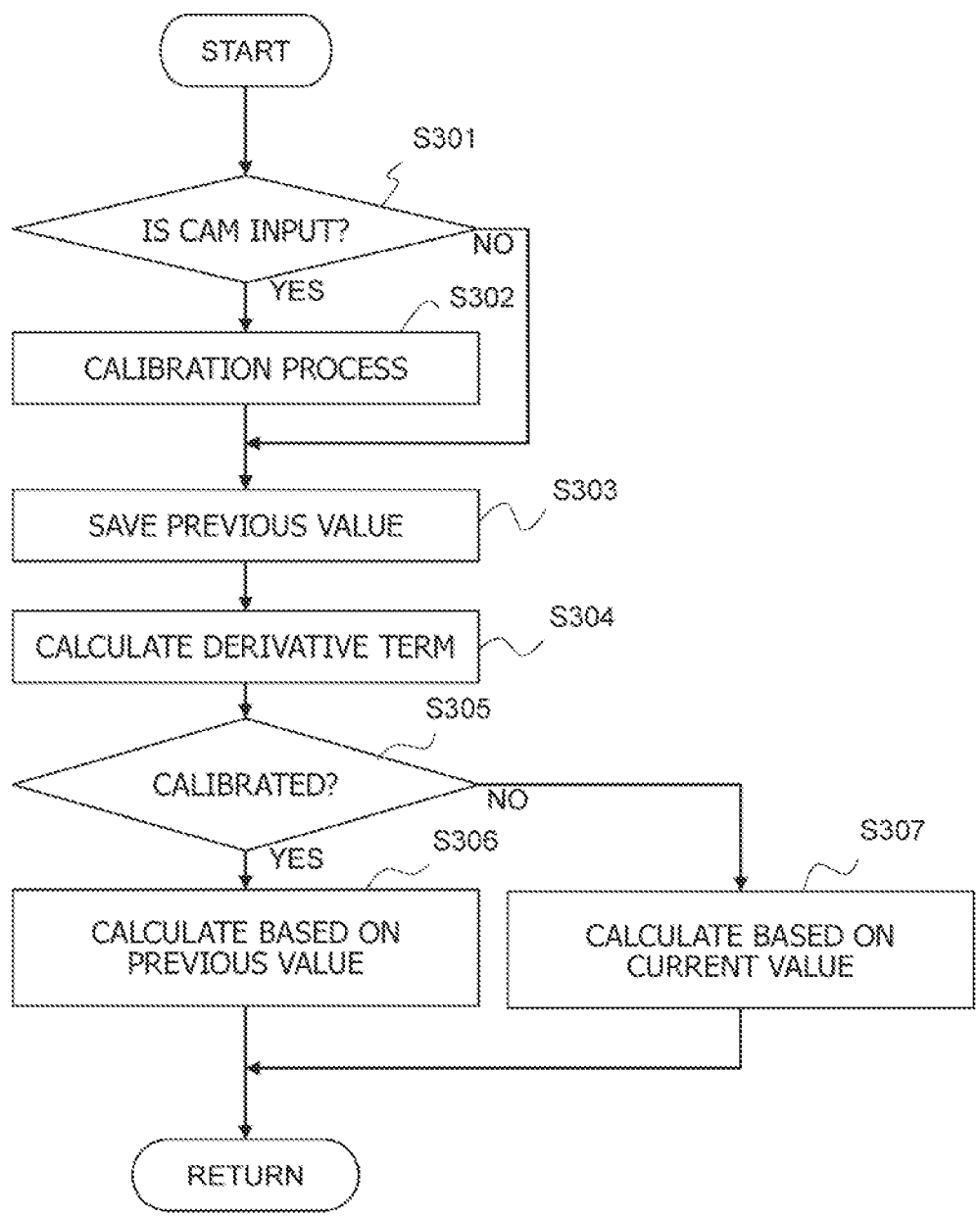
FIG. 8 is a flowchart showing a procedure of the calibration process of the phase measurement and a calculation process of a motor manipulated variable.

A flowchart in FIG. 8 shows an aspect of the process of reducing change in derivative term.

A routine shown in the flowchart in FIG. 8 indicates a process executed by electric VTC driver 202 at an interrupt at regular time intervals.

First, in step S301, electric VTC driver 202 determines whether cam angle signal CAM has been input, in other words, whether it is an update timing of phase measurement RAP and is also a calibration timing of phase measurement RA based on updated phase measurement RAP.

Then, when it is an update timing of phase measurement RAP, the operation of electric VTC driver 202 proceeds to step S302, in which electric VTC driver 202 performs calibration process for making phase measurement RA equal to the latest value of phase measurement RAP obtained based on crank angle signal POS and cam angle signal CAM. Then, the operation proceeds to step S303.

On the other hand, when it is not an update timing of phase measurement RAP, electric VTC driver 202 bypasses step S302 and proceeds to step S303.

In step S303, electric VTC driver 202 saves, in the memory, a derivative term calculated at the previous execution of this routine as the previous value.

Next, in step S304, electric VTC driver 202 calculates a current value of the derivative term based on a derivative value of a deviation between phase measurement RA and target value TA.

Then, in step S305, electric VTC driver 202 determines whether phase measurement RA has been calibrated.

Here, a state in which phase measurement RA has been calibrated is a state in which the derivative term has been calculated in step S304 based on the previous value, which is a deviation based on phase measurement RA before calibration (i.e., uncalibrated phase measurement RA), and the current value, which is the deviation based on phase measurement RA after calibration (i.e., calibrated phase measurement RA).

When phase measurement RA has been calibrated, there is a possibility that phase measurement RA changes in a stepwise manner due to the calibration process, and the derivative term calculated this time in step S304 may have greatly changed from the previous value. A rapid change in the derivative term might generate noise in the manipulated variable of motor 12, and decrease the controllability of the rotational phase.

Therefore, when phase measurement RA has been calibrated, the operation of electric VTC driver 202 proceeds from step S305 to step S306, in which electric VTC driver 202 calculates the motor manipulated variable, using the previous value of the derivative term saved in step S303.

Thus, when calculating the motor manipulated variable, electric VTC driver 202 does not use the derivative term which may have greatly changed from the previous value due to the effects of the calibration process, but uses the derivative term which is the same as the previous one. This makes it possible to prevent noise generation in the motor manipulated variable, which may occur due to the calibration process of phase measurement RA.

In other words, when calibrating phase measurement RA, electric VTC driver 202 obtains the motor manipulated variable, using the previous value, which is the derivative term obtained before calibration, so that the amount of change in derivative term obtained before and after calibration is zero. Therefore, it is possible to prevent noise generation in the motor manipulated variable, which may occur due to the calibration process of phase measurement RA.

Therefore, even if the derivative term greatly changes due to the calibration process of phase measurement RA, it is possible to prevent a decrease in the controllability of the valve timing of intake valve 105.

On the other hand, when it is not the calibration timing of phase measurement RA, and phase measurement RA does not change in a stepwise manner due to the calibration process, then the operation of electric VTC driver 202 proceeds to step S307, in which electric VTC driver 202 calculates the motor manipulated variable, using the current value of the derivative term calculated in step S304 this time.

The current value of the derivative term is a true value that correctly reflects the rate of change in control error, and thus, electric VTC driver 202 uses this current value when obtaining the motor manipulated variable, so as to improve the stability in convergence of the rotational phase.

In such a process shown in the flowchart in FIG. 8, the previous value of the derivative term is used in the calculation of the motor manipulated variable when phase measurement RA has been calibrated. In this case, even when the derivative term is not greatly changed due to the calibration process of phase measurement RA, the previous value of the derivative term is used to calculate the motor manipulated variable. This may decrease the stability in convergence to target value TA.

Thus, electric VTC driver 202 determines whether the derivative term greatly changes such that an amount of change exceeds a predetermined amount due to the calibration process of phase measurement RA, and then, when the derivative term greatly changes, the previous value of the derivative term is used in the calculation of the motor manipulated variable, whereas when the derivative term does not greatly change, the current value is used in the calculation of the motor manipulated variable. This makes it possible to prevent noise generation in the manipulated variable of motor 12, and to prevent a decrease in the stability in convergence to target value TA as much as possible.

Figure 9:
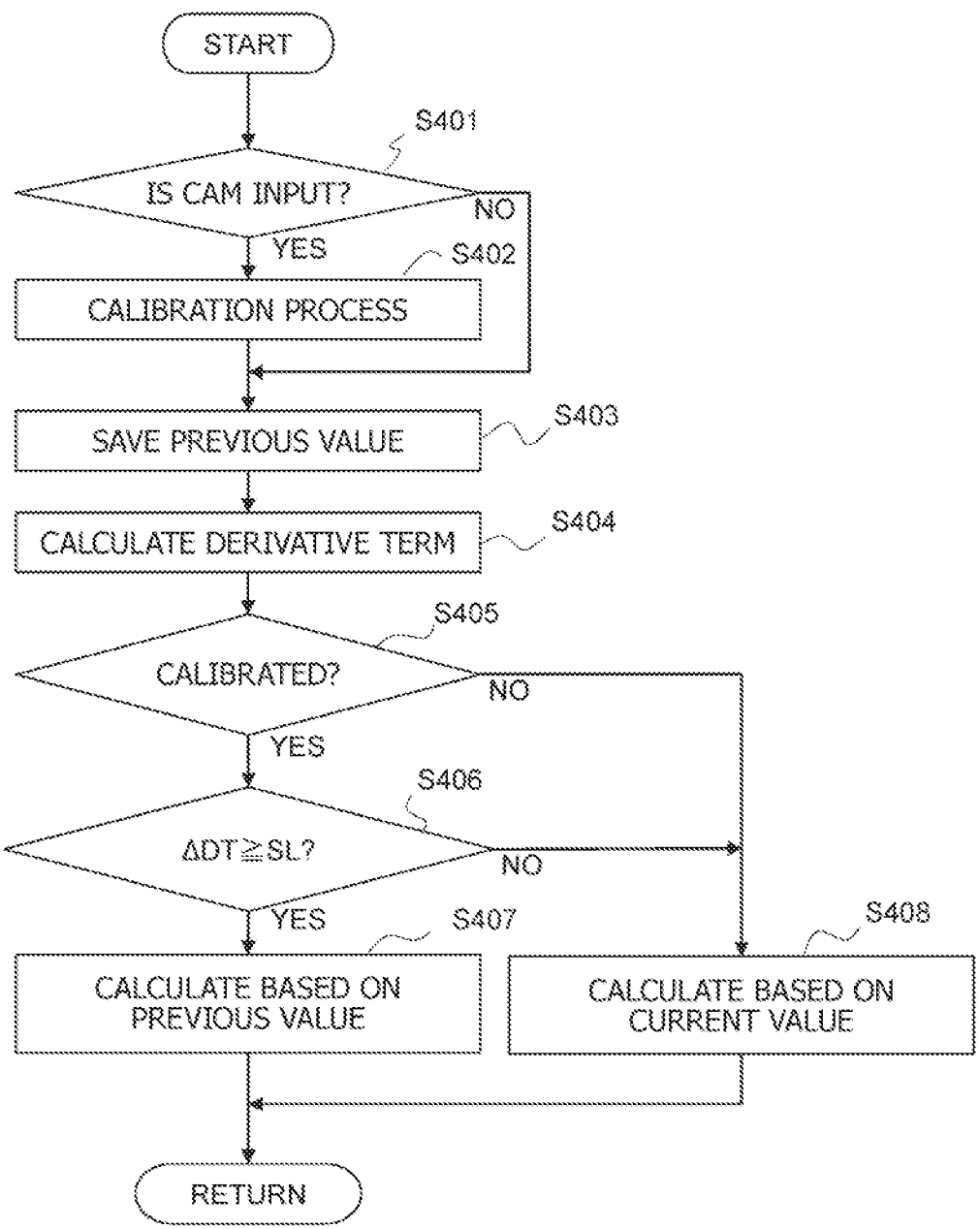
FIG. 9 is a flowchart showing a procedure of the calibration process of the phase measurement and the calculation process of the motor manipulated variable.

A flowchart in FIG. 9 shows a procedure for determining how much the derivative term changes due to the calibration process of phase measurement RA, to switch between the current value and the previous value of the derivative term for use in calculation of the motor manipulated variable.

In the flowchart in FIG. 9, processes in steps S401 to S405 are the same as those in steps S301 to S305, described above, respectively, and detailed description thereof will therefore be omitted.

When electric VTC driver 202 determines in step S405 that phase measurement RA has been calibrated, the operation proceeds to step S406.

In step S406, electric VTC driver 202 determines whether absolute value ΔDT of a deviation between the current value and the previous value of the derivative term is greater than or equal to predetermined value SL, to determine whether the derivative term has greatly changed, by an amount exceeding a set amount, due to the calibration process of phase measurement RA.

It should be noted that, in step S406, the previous value is the derivative term obtained before calibration of phase measurement RA, and the current value is the derivative term obtained after calibration of phase measurement RA, and that the deviation between the current value and the previous value represents the amount of change in derivative term obtained before and after the calibration.

The abovementioned predetermined value SL is adapted to determine whether the noise overlapping on the motor manipulated variable has a noise level that might decrease the controllability of the valve timing. Specifically, when ΔDT is greater than or equal to predetermined value SL, it indicates that the controllability is unacceptably decreased.

When ΔDT is greater than or equal to predetermined value SL, the operation of electric VTC driver 202 proceeds to step S407, in which electric VTC driver 202 calculates the motor manipulated variable, using the previous value of the derivative term saved in step S403, in other words, the derivative term, the change of which is reduced.

That is, electric VTC driver 202 reduces change in derivative term for use in the calculation of the motor manipulated variable so that the amount of change between derivative terms obtained before and after the calibration of phase measurement RA becomes less than predetermined value SL.

By using the previous value of the derivative term in the calculation of the motor manipulated variable, electric VTC driver 202 reduces change in derivative term for use in calculation of the motor manipulated variable. This prevents noise generation in the motor manipulated variable, which may occur due to rapid change in derivative term, resulting in preventing a decrease in the controllability.

On the other hand, when ΔDT is less than predetermined value SL, the operation of electric VTC driver 202 proceeds to step S408, in which electric VTC driver 202 calculates the motor manipulated variable, using the current value of the derivative term calculated in step S404.

The current value of the derivative term is a true value that correctly reflects the rate of change in control error, and thus, in order to improve stability in convergence of the rotational phase, electric VTC driver 202 uses the current value to obtain the motor manipulated variable in a case in which the amount of change in derivative term for use in the calculation of the motor manipulated variable is less than predetermined value SL even when phase measurement RA has been calibrated.

As described above, even when phase measurement RA has been calibrated, electric VTC driver 202 uses the current value of the derivative term in the calculation of the motor manipulated variable in a case in which the amount of change in derivative term due to the calibration of phase measurement RA is less and a decrease in controllability due to noise in motor manipulated variable will be sufficiently reduced.

This allows reduction in the number of situations in which the previous value of the derivative term is used in the calculation of the motor manipulated variable to a minimum, so that it is possible to prevent the stability in convergence to target value TA from decreasing, which may occur when the motor manipulated variable is calculated based on the previous value of the derivative term.

Figure 10:
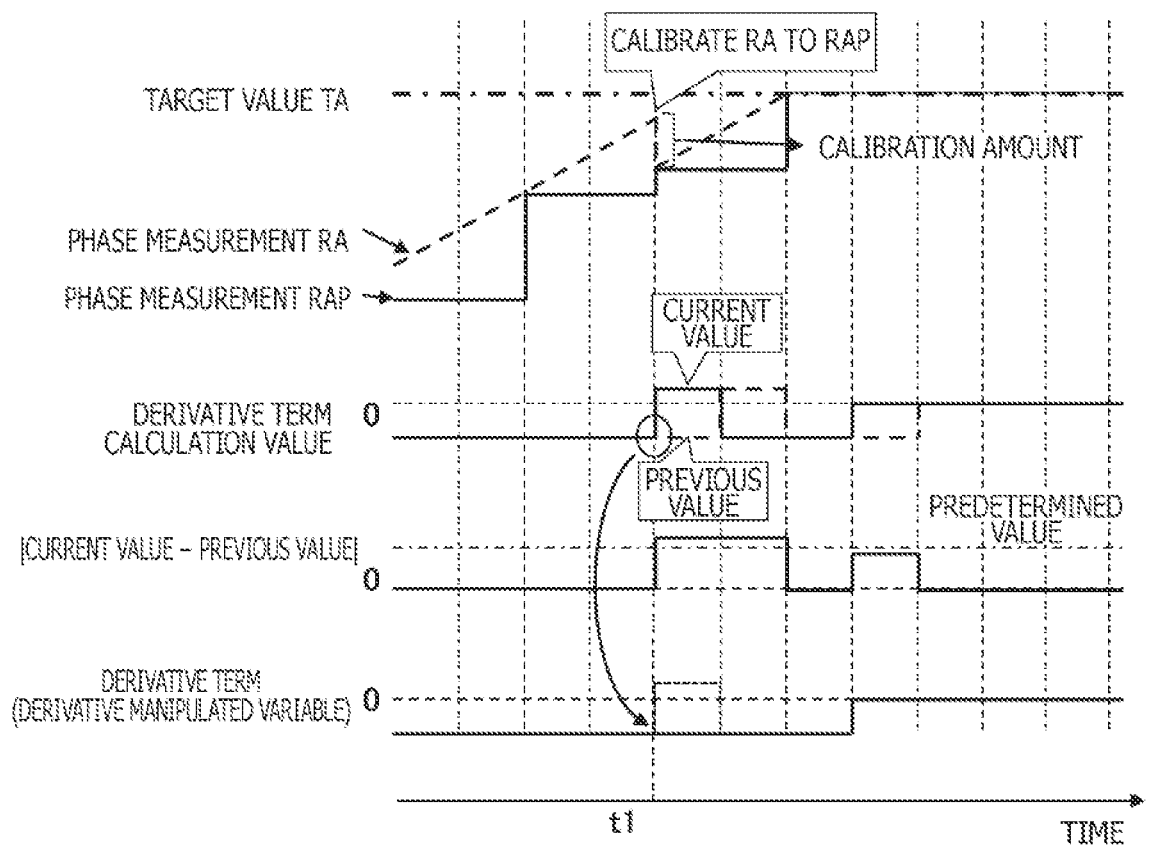
FIG. 10 is a timing diagram for explaining a process in which a previous value is used as the derivative term of the motor manipulated variable.

A timing diagram in FIG. 10 illustrates phase measurement RA and a change in the derivative term when electric VTC driver 202 performs the process shown in the flowchart in FIG. 9.

At time t1 in FIG. 10, phase measurement RAP based on crank angle signal POS and cam angle signal CAM is updated, and electric VTC driver 202 performs a calibration process of phase measurement RA in which phase measurement RA obtained based on motor angle signal MAS and copied crank angle signal POS is made to be equal to updated phase measurement RAP.

When phase measurement RA changes in a stepwise manner due to the calibration process, and thereby, the derivative term greatly changes, absolute value ΔDT of the deviation between the current value and the previous value of the derivative term becomes predetermined value SL or more, so that electric VTC driver 202 uses the previous value of the derivative term to calculate the motor manipulated variable, to prevent noise in the motor manipulated variable.

In the process shown in the flowchart in FIG. 9, electric VTC driver 202 switches between the current value and the previous value of the derivative term for use in the calculation of the motor manipulated variable depending on whether absolute value ΔDT of the deviation between the current value and the previous value of the derivative term when phase measurement RA is subjected to calibration is greater than or equal to predetermined value SL. However, the present invention is not limited thereto, and an intermediate value between the current value and the previous value of the derivative term, that is, a value obtained by reducing the current value by a percentage may be used to calculate the motor manipulated variable.

Figure 11:
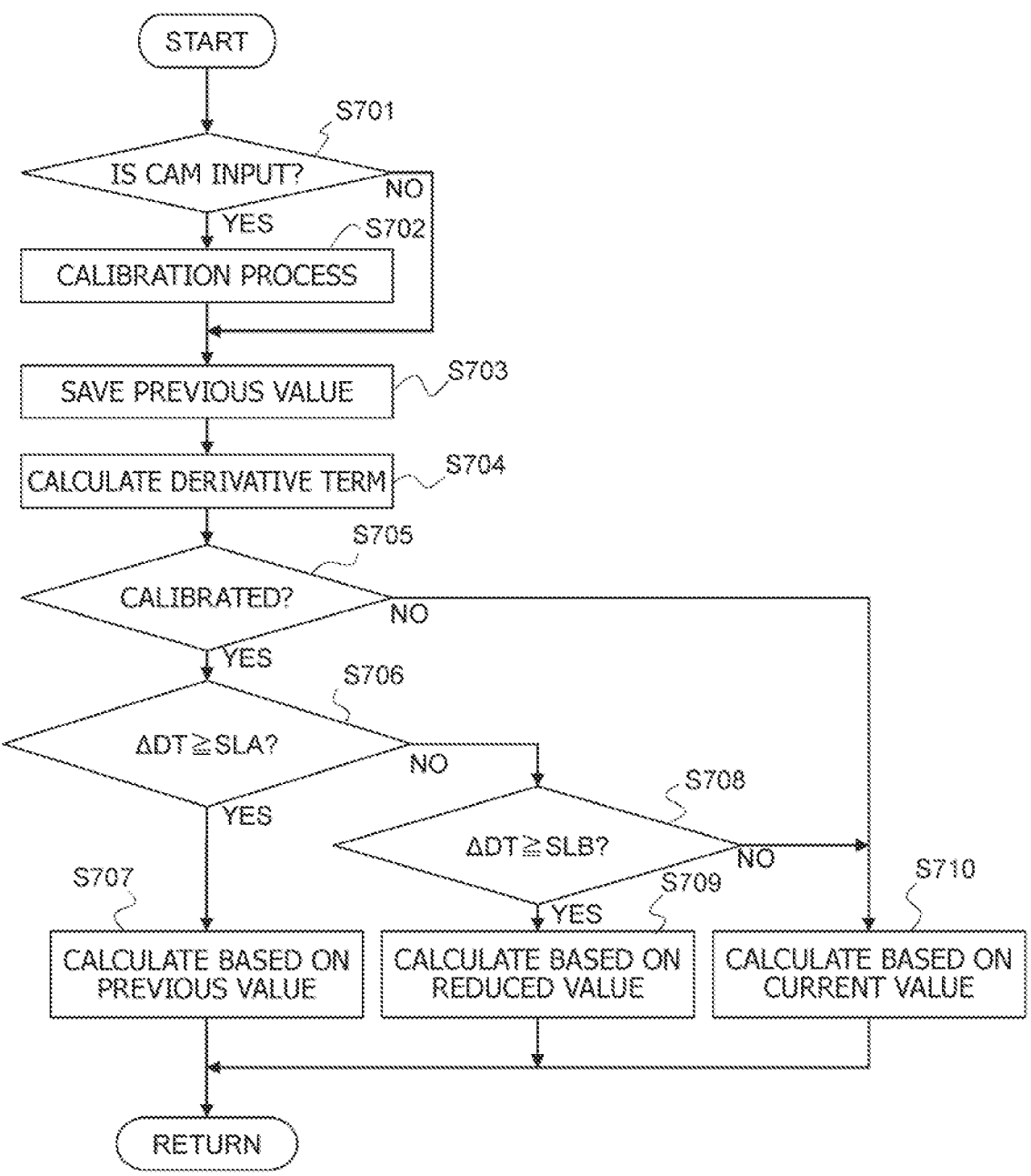
FIG. 11 is a flowchart showing a procedure of the calibration process of the phase measurement and the calculation process of the motor manipulated variable.

A routine shown in a flowchart in FIG. 11 indicates a computing process of the motor manipulated variable, using the intermediate value between the current value and the previous value of the derivative term, depending on absolute value ΔDT of the deviation between the current value and the previous value of the derivative term, when phase measurement RA has been calibrated.

In the flowchart in FIG. 11, processes in steps S701 to S705 are the same as those in steps S301 to S305, described above, respectively, and detailed description thereof will therefore be omitted.

When electric VTC driver 202 determines in step S705 that phase measurement RA has been calibrated, the operation proceeds to step S706.

In step S706, electric VTC driver 202 determines whether absolute value ΔDT of the deviation between the current value and the previous value of the derivative term is greater than or equal to first predetermined value SLA.

Here, when ΔDT is greater than or equal to first predetermined value SLA, that is, when the change in derivative term due to the calibration of phase measurement RA is large and remarkable, the operation of electric VTC driver 202 proceeds to step S707, in which electric VTC driver 202 calculates the motor manipulated variable, using the previous value of the derivative term saved in step S703.

On the other hand, when ΔDT is less than first predetermined value SLA, the operation of electric VTC driver 202 proceeds to step S708, in which electric VTC driver 202 determines whether ΔDT is greater than or equal to second predetermined value SLB (SLB<SLA).

Then, when ΔDT is less than first predetermined value SLA and is greater than or equal to second predetermined value SLB, that is, when the change in derivative term due to the calibration of phase measurement RA is relatively slight, the operation of electric VTC driver 202 proceeds to step S709.

In step S709, electric VTC driver 202 calculates the motor manipulated variable, using the intermediate value between the current value and the previous value of the derivative term, in other words, using a result of reducing the current value by a percentage so as to have the current value approach the previous value.

Thus, also in a case in which the calibration amount of phase measurement RA is relatively small, the previous value of the derivative term is used in the calculation of the motor manipulated variable, so that it is possible to prevent a decrease in the stability in convergence to target value TA.

Furthermore, the operation of electric VTC driver 202 proceeds from step S705 to step S710 when phase measurement RA is not calibrated. Also, when ΔDT is less than second predetermined value SLB and the change in derivative term due to the calibration of phase measurement RA is small enough to be ignored, the operation proceeds from step S708 to step S710.

In step S710, electric VTC driver 202 calculates the motor manipulated variable, using the current value of the derivative term calculated in step S704 this time.

As described in the foregoing, in the process shown in the flowchart in FIG. 11, electric VTC driver 202 uses any one of the previous value, the current value, and the intermediate value, depending on the amount of stepwise change in derivative term due to the calibration of phase measurement RA, to calculate the motor manipulated variable.

Therefore, when the stepwise change in derivative term due to the calibration of phase measurement RA is relatively small, it is possible to perform the derivative action depending on the rate of change in the deviation to some extent, to improve the stability in convergence to target value TA, while preventing noise in the motor manipulated variable.

Here, if angular intervals of input cam angle signals CAM vary due to insufficient mechanical position precision of the sensor, phase measurement RAP varies for each cam angle signal CAM due to the angle variation. This may cause a deviation between phase measurement RA and phase measurement RAP for each input, which generates noise in the motor manipulated variable.

Furthermore, as the rotational speed of internal combustion engine 101 increases, time intervals of input of cam angle signal CAM become shorter, the frequency of noise generation associated with the calibration process increases, and the influence of noise on the valve timing control increases.

In order to reduce such frequent occurrence of noise due to variation in input interval of cam angle signal CAM, electric VTC driver 202 may skip calibration. Specifically, instead of performing calibration of phase measurement RA each time cam angle signal CAM is input, in other words, instead of performing calibration every time phase measurement RAP is updated, electric VTC driver 202 may perform calibration at some of input timings of cam angle signal CAM and may omit calibration at the other.

Specifically, electric VTC driver 202 performs the calibration process of phase measurement RA when one specific cam angle signal CAM, in other words, cam angle signal CAM which indicates that one specific cylinder is at the reference piston position has been input, in the high rotational speed area of internal combustion engine 101, whereas electric VTC driver 202 performs no calibration process in a case of input of the other cam angle signals CAM.

Thus, in a case in which electric VTC driver 202 performs the calibration process of phase measurement RA only when one specific cam angle signal CAM has been input, the calibration process of phase measurement RA is performed only once per rotation of intake camshaft 115a.

On the other hand, in a case in which electric VTC driver 202 performs the calibration process of phase measurement RA every time cam angle signal CAM is input, in other words, every time phase measurement RAP is updated, the calibration process of phase measurement RA is performed four times per rotation of intake camshaft 115a in the four-cylinder engine, which has a signal pattern shown in FIG. 2.

Figure 12:
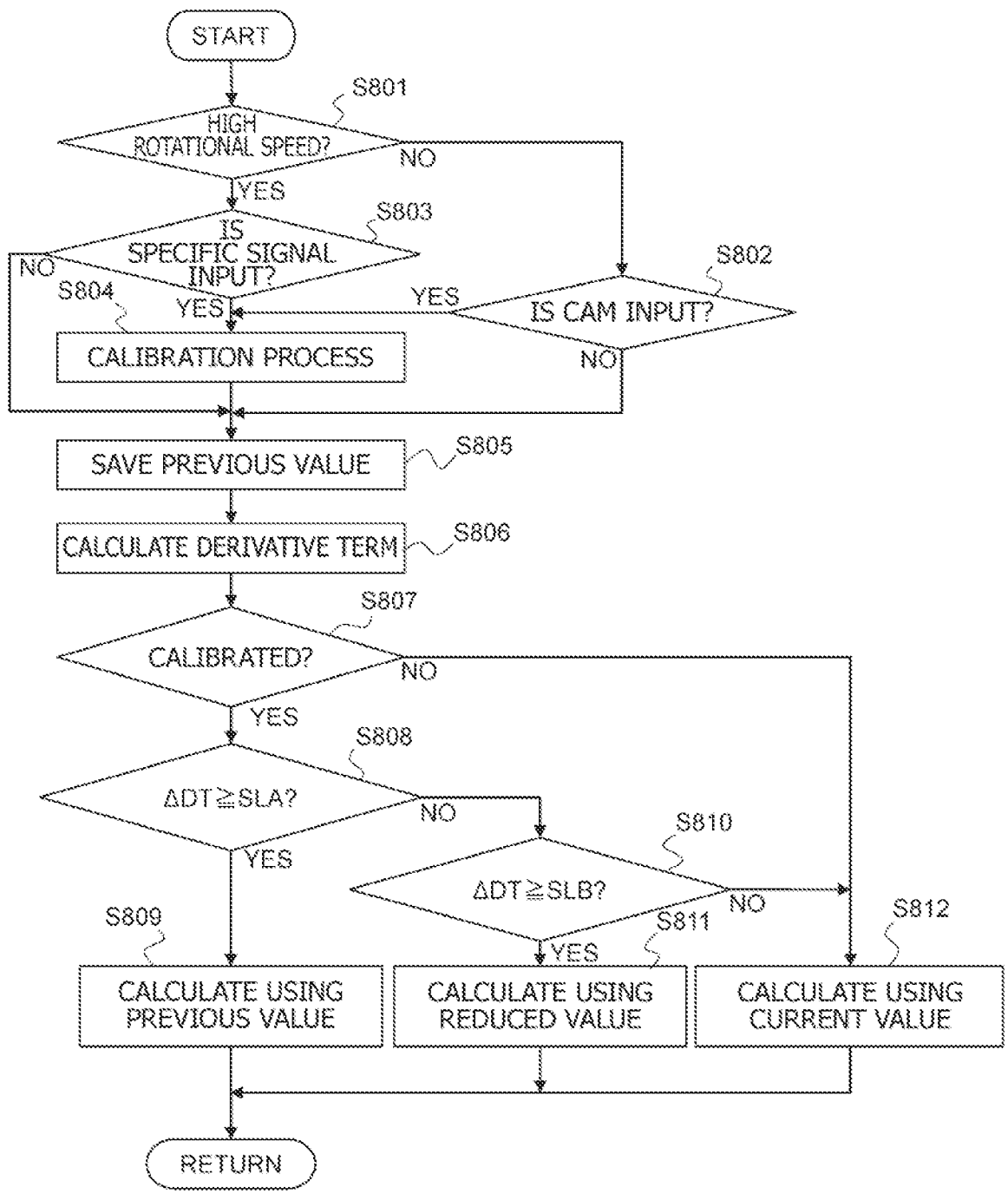
FIG. 12 is a flowchart showing a procedure of the calibration process of the phase measurement and the calculation process of the motor manipulated variable.

A flowchart in FIG. 12 shows a calculation procedure of the motor manipulated variable for use in a case in which the calibration process of phase measurement RA is performed only when one specific cam angle signal CAM is input in the high rotational speed area of internal combustion engine 101, so as to skip calibration.

First, in step S801, electric VTC driver 202 determines whether the rotational speed of internal combustion engine 101 exceeds a set rotational speed.

The set rotational speed is a threshold for determining whether the feedback controllability is lowered below the allowable range when the calibration process is performed every time cam angle signal CAM is input.

That is, when the calibration process is performed every time cam angle signal CAM is input, the higher the rotational speed of internal combustion engine 101, the higher the frequency of noise generation due to the variation in input interval of cam angle signals CAM, resulting in a decrease in the feedback controllability.

Therefore, when the calibration process is performed every time cam angle signal CAM is input, an upper limit of the rotational speed at which a decrease in feedback controllability remains within an allowable range even if noise is generated due to the variation in input interval of cam angle signals CAM, is set as the set rotational speed.

Here, when the rotational speed of internal combustion engine 101 is less than or equal to the set rotational speed, the operation of electric VTC driver 202 proceeds to step S802, in which electric VTC driver 202 determines whether cam angle signal CAM has been input, in other words, whether it is an update timing of phase measurement RAP and is also a calibration timing of phase measurement RA based on updated phase measurement RAP.

Then, when cam angle signal CAM has been input, the operation of electric VTC driver 202 proceeds to step S804, in which electric VTC driver 202 performs the calibration process for making phase measurement RA equal to the latest value of phase measurement RAP obtained based on crank angle signal POS and cam angle signal CAM.

That is, when the rotational speed of internal combustion engine 101 is less than or equal to the set rotational speed, electric VTC driver 202 performs the calibration process of phase measurement RA every time cam angle signal CAM is input, in other words, every time phase measurement RAP is updated.

On the other hand, when the rotational speed of internal combustion engine 101 exceeds the set rotational speed, the operation of electric VTC driver 202 proceeds from step S801 to step S803.

Electric VTC driver 202 determines in step S803 whether one specific cam angle signal CAM has been input, and then, when one specific cam angle signal CAM has been input, the operation proceeds to step S804, in which electric VTC driver 202 performs a calibration process for making phase measurement RA equal to phase measurement RAP.

When internal combustion engine 101 is a four-cylinder engine, electric VTC driver 202 determines in step S803 whether there has been input cam angle signal CAM which indicates that, for example, the first cylinder is at the reference piston position.

When cam angle signal CAM which indicates that the first cylinder is at the reference piston position has been input, the operation of electric VTC driver 202 proceeds to step S804, in which electric VTC driver 202 performs the calibration process of phase measurement RA.

On the other hand, when cam angle signal CAM which indicates that any one of the second to fourth cylinders is at the reference piston position has been input, the operation of electric VTC driver 202 bypasses step S804, so that electric VTC driver 202 does not perform the calibration process of phase measurement RA.

That is, when the rotational speed of internal combustion engine 101 is high, electric VTC driver 202 skips the calibration process of phase measurement RA at some of input timings of cam angle signal CAM, to reduce the frequency of the calibration process, to thereby reduce the frequency of noise generation. In other words, electric VTC driver 202 reduces the calibration frequency of phase measurement RA as the rotational speed of internal combustion engine 101 increases.

Therefore, since electric VTC driver 202 performs the calibration process of phase measurement RA only when one specific cam angle signal CAM has been input, it is possible to reduce variation of phase measurement RAP for use in the calibration process, which may be caused by the variation in angular intervals of input cam angle signals CAM. This makes it possible to reduce the change in derivative term, which may occur due to the calibration process, and to prevents noise generation in the motor manipulated variable at a high frequency.

After performing the calibration process of phase measurement RA as described above, electric VTC driver 202 saves the previous value of the derivative term, calculates the current value of the derivative term, and selects a value of the derivative term depending on the amount of change in the derivative term, in steps S805 to S812, as in steps S703 to S710 described above.

The technical concepts described in the above embodiment may be used in combination with each other as necessary, as long as no conflict arises.

Furthermore, although the invention has been described in detail with reference to the preferred embodiment, it is apparent that the invention may be modified in various forms by one skilled in the art based on the fundamental technical concept and teachings of the invention.

For example, as a method for reducing change in derivative term, electric VTC driver 202 (control device of the variable valve timing mechanism) may subject the derivative term to, for example, low-pass filter processing, or weighted average processing.

Furthermore, instead of the abovementioned pattern in which the calibration process is performed only when one specific cam angle signal CAM has been input, the calibration process of phase measurement RA may be skipped, in the high rotational speed area of internal combustion engine 101, according to a pattern in which a calibration process is performed when cam angle signals CAM corresponding to, for example, two cylinders or three cylinders in four-cylinder engine have been input.

Furthermore, electric VTC driver 202 may change the frequency of the calibration process to be less in a stepwise manner, as the rotational speed of internal combustion engine 101 increases.

Since electric VTC driver 202 skips the calibration process of phase measurement RA at some input timings of cam angle signal CAM, instead of calibrating every time cam angle signal CAM is input, it is possible to prevent noise generation in a manipulated variable at a high frequency, and ultimately, it is possible to reduce a decrease in controllability, which may be caused by noise in the manipulated variable.

Variable valve timing mechanism 114 is not limited to the mechanism illustrated in FIGS. 3 to 5. Alternatively, variable valve timing mechanism 114 may be a variable valve timing mechanism which includes a sprocket, a cam plate, a link mechanism, a guide plate, a speed reducer, and a motor, as disclosed in JP 2008-069719 A, for example.

Furthermore, variable valve timing mechanism 114 may be provided in internal combustion engine 101 as a mechanism that changes the rotational phase of exhaust camshaft 115b relative to the crankshaft 109. In this case as well, ECM 201 and electric VTC driver 202 control variable valve timing mechanism 114 by having similar configurations and by performing similar processes, and thus, achieve similar advantageous effects to those described above.

Furthermore, electric VTC driver 202 may perform motor control based on phase measurement RA in a low rotational speed area in which the rotational speed of internal combustion engine 101 is less than or equal to a set rotational speed, whereas electric VTC driver 202 may perform motor control based on phase measurement RAP in a high rotational speed area in which the rotational speed of internal combustion engine 101 exceeds the set rotational speed in a case in which phase measurement RAP is updated at shorter time intervals.

Furthermore, when performing the calibration process for making phase measurement RA equal to phase measurement RAP, electric VTC driver 202 may perform a process for reducing change in motor manipulated variable obtained by using the derivative term calculated by using calibrated phase measurement RA, that is a low-pass filter process, to control motor 12 based on the resultant motor manipulated variable.

REFERENCE SYMBOL LIST

12 Motor
101 Internal combustion engine
105 Intake valve
109 Crankshaft
114 Variable valve timing mechanism
115a Intake camshaft
201 Engine control module (ECM)
202 Electric VTC driver
203 Crank angle sensor
204 Cam angle sensor
210 Motor angle sensor

The invention claimed is:

1. A control device of a variable valve timing mechanism that makes a rotational phase of a camshaft variable relative to a crankshaft of an internal combustion engine by adjusting rotation of a motor, the control device being configured to:
    obtain information on a rotational angle of the motor, information on a rotational angle of the crankshaft, and information on a rotational angle of the camshaft;
    obtain a first measurement of the rotational phase based on the rotational angle of the motor;
    obtain a second measurement of the rotational phase based on a relative relationship between the rotational angle of the crankshaft and the rotational angle of the camshaft;
    calibrate the first measurement based on the second measurement;
    obtain a derivative term proportional to a rate of change in a deviation between the first measurement and a target value of the rotational phase;
    reduce change in derivative term when calibrating the first measurement based on the second measurement;
    obtain a manipulated variable of the motor based on the derivative term; and
    control the motor based on the manipulated variable.

2. The control device of the variable valve timing mechanism according to claim 1, wherein the control device is configured to reduce change in the derivative term so that an amount of change between a derivative term obtained from the first measurement and a derivative value obtained from the calibrated first measurement becomes less than a predetermined value.

3. The control device of the variable valve timing mechanism according to claim 1, wherein the control device is configured to reduce change in the derivative term by obtaining the manipulated variable, using a derivative term obtained from the first measurement.

4. The control device of the variable valve timing mechanism according to claim 1, wherein the control device is configured to reduce a calibration frequency of the first measurement as a rotational speed of the internal combustion engine increases.

5. A control method for a variable valve timing mechanism that makes a rotational phase of a camshaft variable relative to a crankshaft of an internal combustion engine by adjusting rotation of a motor, the control method comprising the steps of:
    obtaining a first measurement of the rotational phase based on a rotational angle of the motor;
    obtaining a second measurement of the rotational phase based on a relative relationship between a rotational angle of the crankshaft and a rotational angle of the camshaft;
    calibrating the first measurement based on the second measurement;
    obtaining a derivative term proportional to a rate of change in a deviation between the first measurement and a target value of the rotational phase;
    reducing change in the derivative term when calibrating the first measurement based on the second measurement; and
    controlling the motor based on a manipulated variable including the derivative term.

* * * * *